United States Patent [19]
Skinner

[11] Patent Number: 5,439,052
[45] Date of Patent: Aug. 8, 1995

[54] PITLESS ADAPTER VALVE FOR WELLS

[76] Inventor: Earl F. Skinner, 4250 Murphy Rd., Kuna, Id. 83634

[21] Appl. No.: 189,035

[22] Filed: Jan. 29, 1994

[51] Int. Cl.[6] ........................................ E21B 34/16
[52] U.S. Cl. ............................. 166/88; 137/625.46
[58] Field of Search ................. 166/66, 85, 88, 89, 166/319; 137/901, 625.18, 625.41, 625.46

[56] References Cited

U.S. PATENT DOCUMENTS

| | | | |
|---|---|---|---|
| 3,154,148 | 10/1964 | Peterson | 166/88 |
| 3,380,533 | 4/1968 | Andrew | 166/88 |
| 3,414,057 | 12/1968 | Harbison | 166/105 |
| 3,721,265 | 3/1973 | Hoffland | 137/625.47 |
| 3,722,586 | 3/1973 | Baker | 166/85 |
| 3,872,890 | 3/1975 | Hare | 137/625.41 |
| 3,875,698 | 4/1975 | Clark | 417/38 |
| 3,976,131 | 8/1976 | Woodford et al. | 166/88 X |
| 4,036,249 | 7/1977 | Perry, Sr. et al. | 137/367 |
| 4,037,654 | 7/1977 | Lien | 166/88 |
| 4,044,789 | 8/1977 | Elmore | 137/367 |
| 4,073,314 | 2/1978 | Speelman et al. | 137/625.47 |
| 4,226,286 | 10/1980 | Cramer | 166/88 X |
| 4,308,816 | 1/1982 | Fritz, Jr. | 166/86 |
| 4,416,328 | 11/1983 | Baski | 166/65 R |
| 4,611,657 | 9/1986 | Doering | 166/88 |
| 4,651,775 | 3/1987 | Okada | 137/625.41 |
| 4,653,522 | 3/1987 | Fillman et al. | 137/1 |
| 4,664,185 | 5/1987 | Barnard | 166/66 |
| 4,681,133 | 7/1987 | Weston | 166/88 X |

*Primary Examiner*—Roger J. Schoeppel
*Attorney, Agent, or Firm*—Korfanta & Dunbar

[57] ABSTRACT

A pitless adapter which includes a diverter valve for selectively diverting water from the pump side of the pitless adapter to a purge line or from the pump side of the pitless adapter to a supply line. The pitless adapter valve of the preferred embodiment employs a standard "T" shaped housing including a three-way ball valve to selectively divert the water from the lower well inlet port to either the upper purge outlet port or the side supply outlet port. A face plate is attached around the supply outlet port and configured to be slidably received and held by the pitless adapter shoe. A valve actuator handle and handle extender are provided so that the valve can be operated from ground level at the top of the well casing.

14 Claims, 9 Drawing Sheets

PITLESS ADAPTER VALVE FOR WELLS

BACKGROUND OF THE INVENTION

1. Technical Field

This invention generally relates to frost-free well installations. More particularly, this invention relates to a pitless well adapter which includes a purge valve for clearing sediment from a well and at the same time preventing sediment from entering the main supply line.

2. Background

Figure 1A:
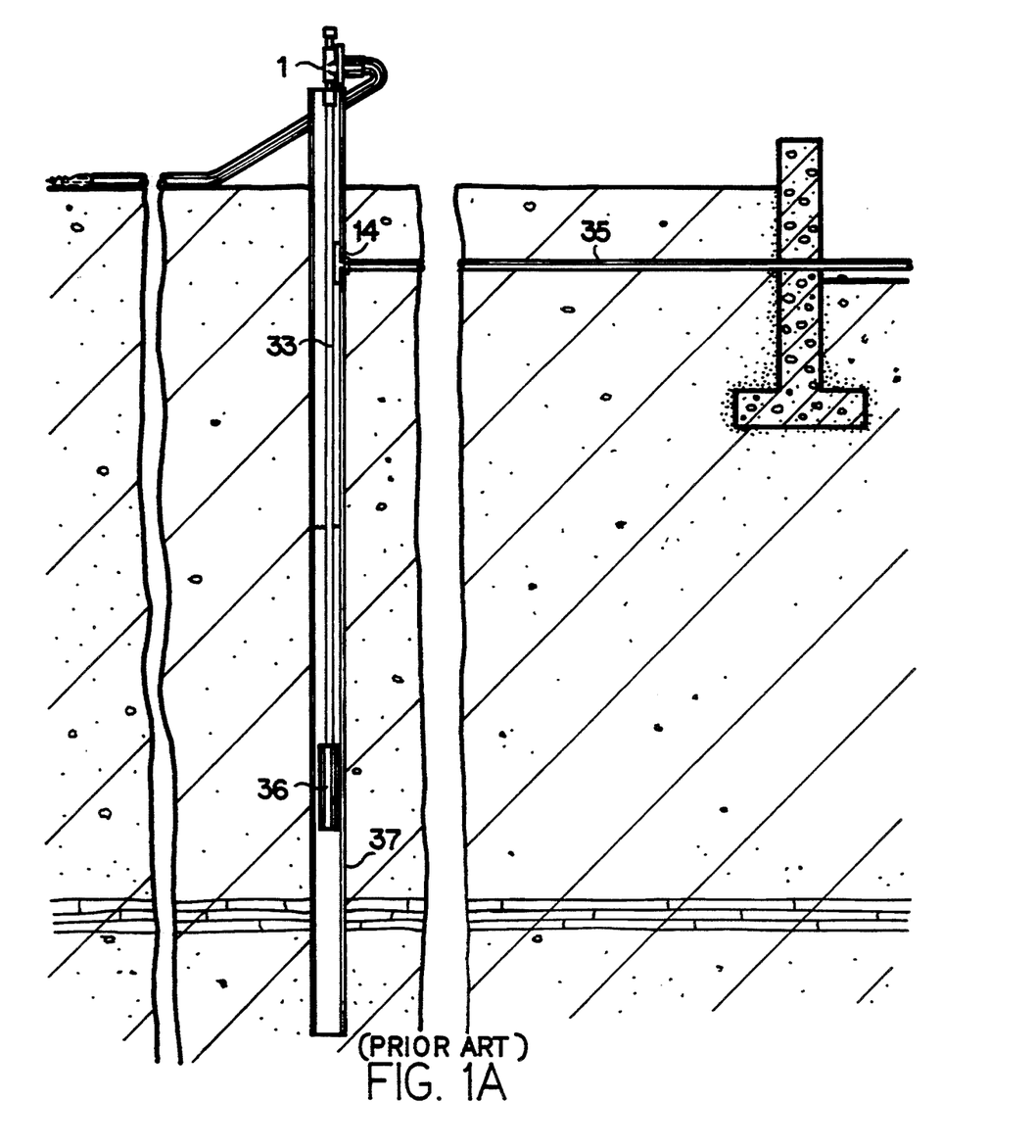
FIG. 1A is a side sectional representation of the prior art well installation with the pump being partially set into the well.
Figure 1B:
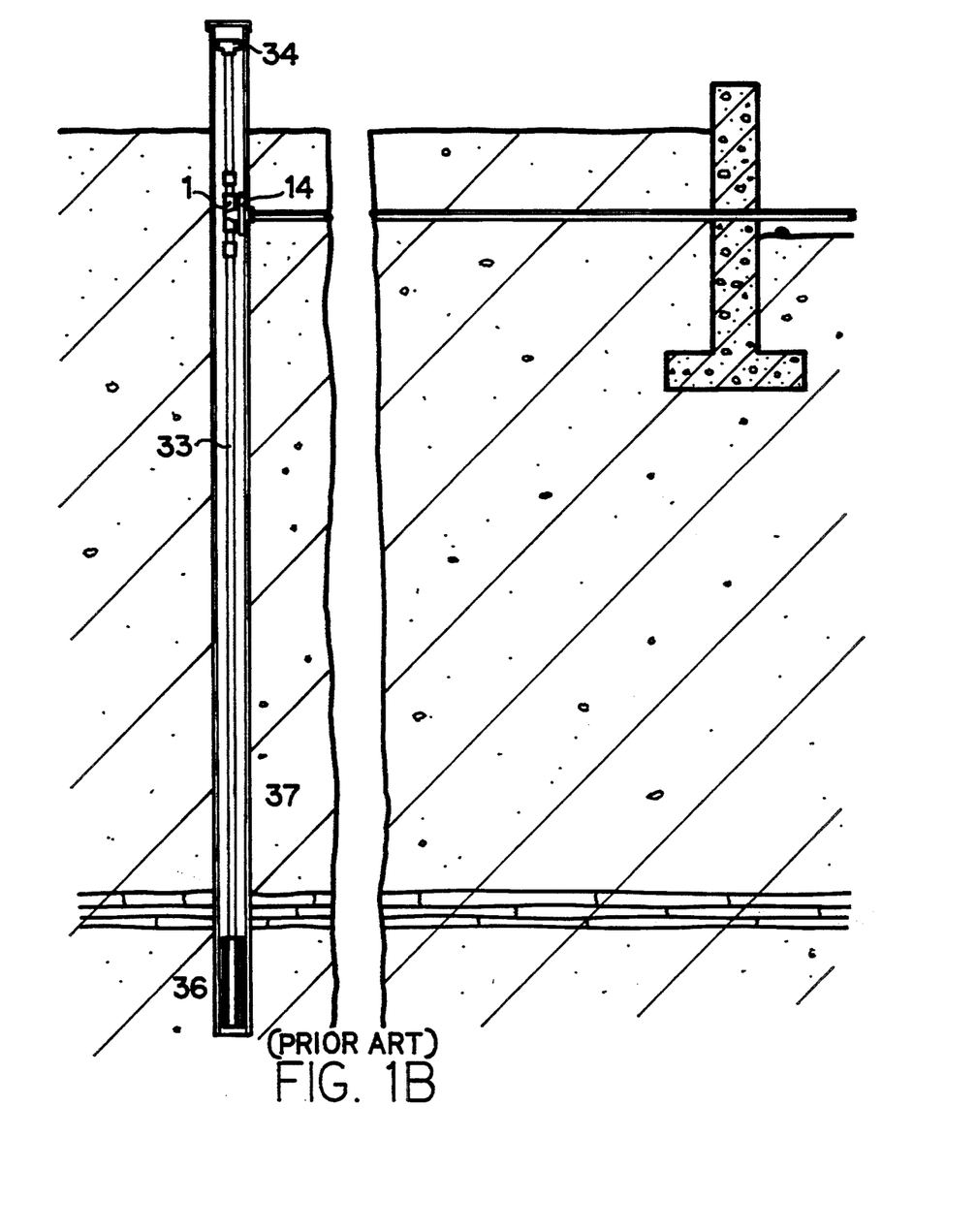
FIG. 1B is a side sectional representation of the prior art well installation having the pump set completely in the well.

For the purposes of this Background section, reference will be made to Prior Art FIGS. 1A and 1B of the drawings.

Currently, domestic well installations require a two-part installation procedure. Once the well is dug and well casing 37 is in place, pump 36 is partially lowered below the water line and temporarily set in this position, shown in FIG. 1A, using a pump setting rig, not shown. Pump 36 is then activated and the well is cleared by pumping sediment-filled water from the well. Usually it takes at least a day, sometimes longer, to pump all the sediment from the well. Once the well is clear, the pump setting rig is again backed up to the well and pump 36, drop pipe 33, pitless adapter 1 and letdown pipe 34 are lowered into their final position, engaging pitless adapter 1 with its receiving shoe 14 to complete the well installation, as is shown in FIG. 1B. This procedure requires the pump setting rig to be used on two separate occasions.

Additionally, there are occasions where all of the sediment is not cleared the first time or underground activity causes sediment to again be introduced into the well. When this happens, it is necessary to again back the pump setting rig up to the well and raise it partially out of the well casing, so that a purge line may be engaged with the pitless adapter to clear the well. In addition to the expense involved in using the pump setting rig, severe damage can be caused to the surrounding landscape by the pump setting rig.

What is needed is a way to eliminate the use of a pump setting rig for clearing a domestic well installation of sediment. Accordingly, one object of this invention is to satisfy this need.

DISCLOSURE OF INVENTION

This object, and others, is satisfied by a pitless adapter which includes a diverter valve for selectively diverting water from the pump side of the pitless adapter to a purge line or from the pump side of the pitless adapter to a supply line.

The prior art pitless adapter includes a single passage therethrough connecting the pump side of the adapter with the supply line side of the adapter. Essentially, the adapter acts as a 90° elbow to channel the water from the drop pipe to the supply pipe, which supplies water to the house. The pitless adapter itself resembles a standard "T" pipe fitting having an adapter plate surrounding the supply outlet. The adapter plate is configured to be slidably received and frictionally held in an adapter shoe. The adapter shoe is attached through the well casing to the supply pipe which supplies the house. A permanent partition is formed within the "T" shaped housing to prevent water from exiting out of the top of the adapter. A female threaded fitting is provided at the top of the adapter to receive a pipe, solely as a structural connection to aid in lowering and raising the pitless adapter, drop pipe and pump.

The pitless adapter valve of the present invention employs the standard "T" shaped housing, however, there is no partition provided to prevent the water from flowing out the top of the adapter housing. Instead, a three-way ball valve is employed to selectively divert the water from the lower well inlet port to either the upper purge outlet port or the side supply outlet port. Like the prior art, a face plate is attached around the supply outlet port and configured to be slidably received and held by the pitless adapter shoe. A valve actuator handle and handle extender are provided so that the valve can be operated from ground level at the top of the well casing.

The pitless adapter valve of the present invention allows the pump to be set all the way down into the well and the face plate engaged with the adapter shoe. With a let-down pipe threadably engaged with the purge outlet port, a flexible hose can be attached to the top of the let-down pipe and the valve set to the purge position to clear the well. Once the well is clear, the actuator handle is set to the supply position, thereby making the connection between the pump and the house. The flexible hose is removed and the well casing sealed in a normal manner. The primary advantage to this procedure is that the pump setting rig need only be used once to set the pump the first time and is not needed thereafter. Additionally, should it become necessary to clear the well again, a pump setting rig is not needed.

BEST MODE FOR CARRYING OUT INVENTION

Referring now to FIGS. 2–5, the pitless adapter valve is illustrated in detail and is generally designated as 10.

Pitless adapter valve 10 has a "T" shaped adapter housing 11 formed from a suitable material, such as brass, formed by conventional techniques, such as casting and finish machining. Adapter housing 11 includes a well inlet port 16 formed in its bottom, a purge outlet port 18 formed in its top, and a supply outlet port 17 formed along its side. Female threads 19 circumvolve the well inlet port 16, supply outlet port 17 and purge outlet port 18. A face plate 12 is formed around supply outlet port 17 to lie in a plane parallel to the vertical axis of adapter housing 11. Face plate 12 has a curved lower edge which is also beveled to facilitate engagement of face plate 12 with adapter shoe slide 14. A annular recess is formed concentrically around supply outlet port 17, in face plate 12, to receive and hold an "O" ring 13 to provide a positive water-tight seal between supply outlet port 17 and supply pipe 35, explained below.

Figure 4A:
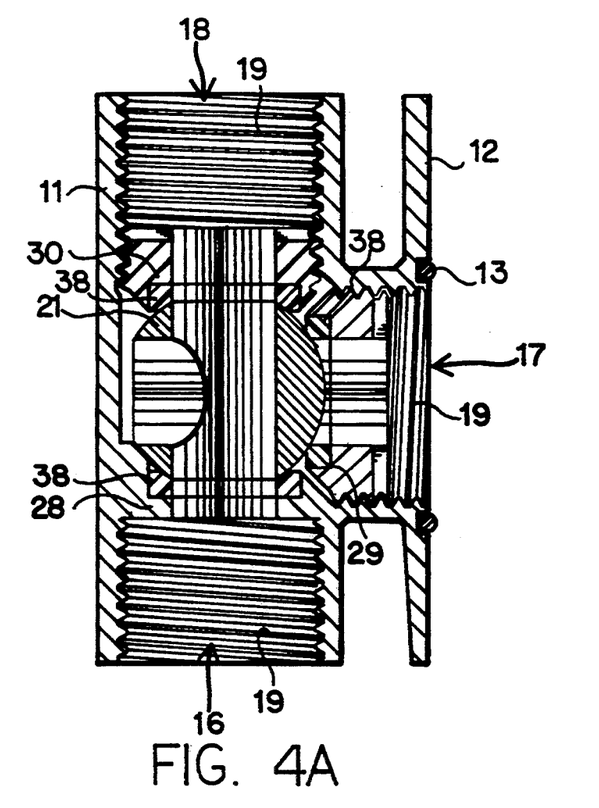
FIG. 4A is a side sectional view taken along section line 4A of FIG. 3A.
Figure 4B:
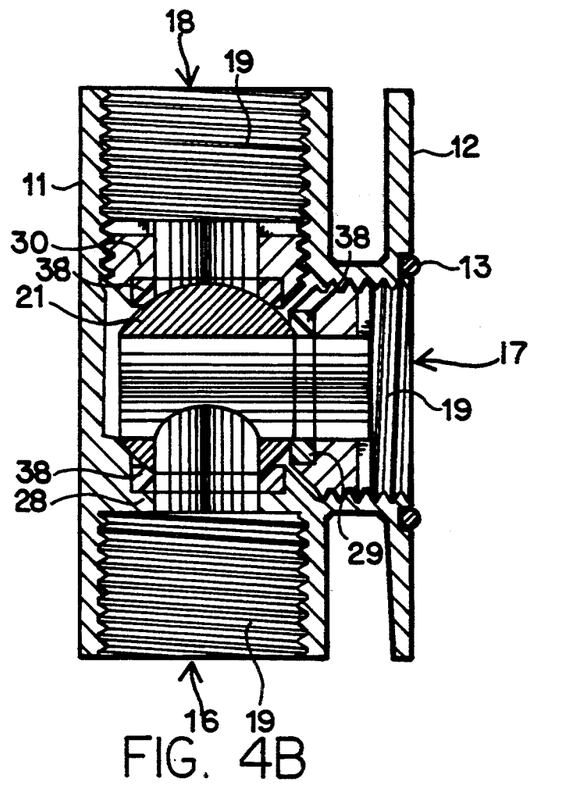
FIG. 4B is a side sectional view taken along section line 4B of FIG. 3B.
Figure 5:
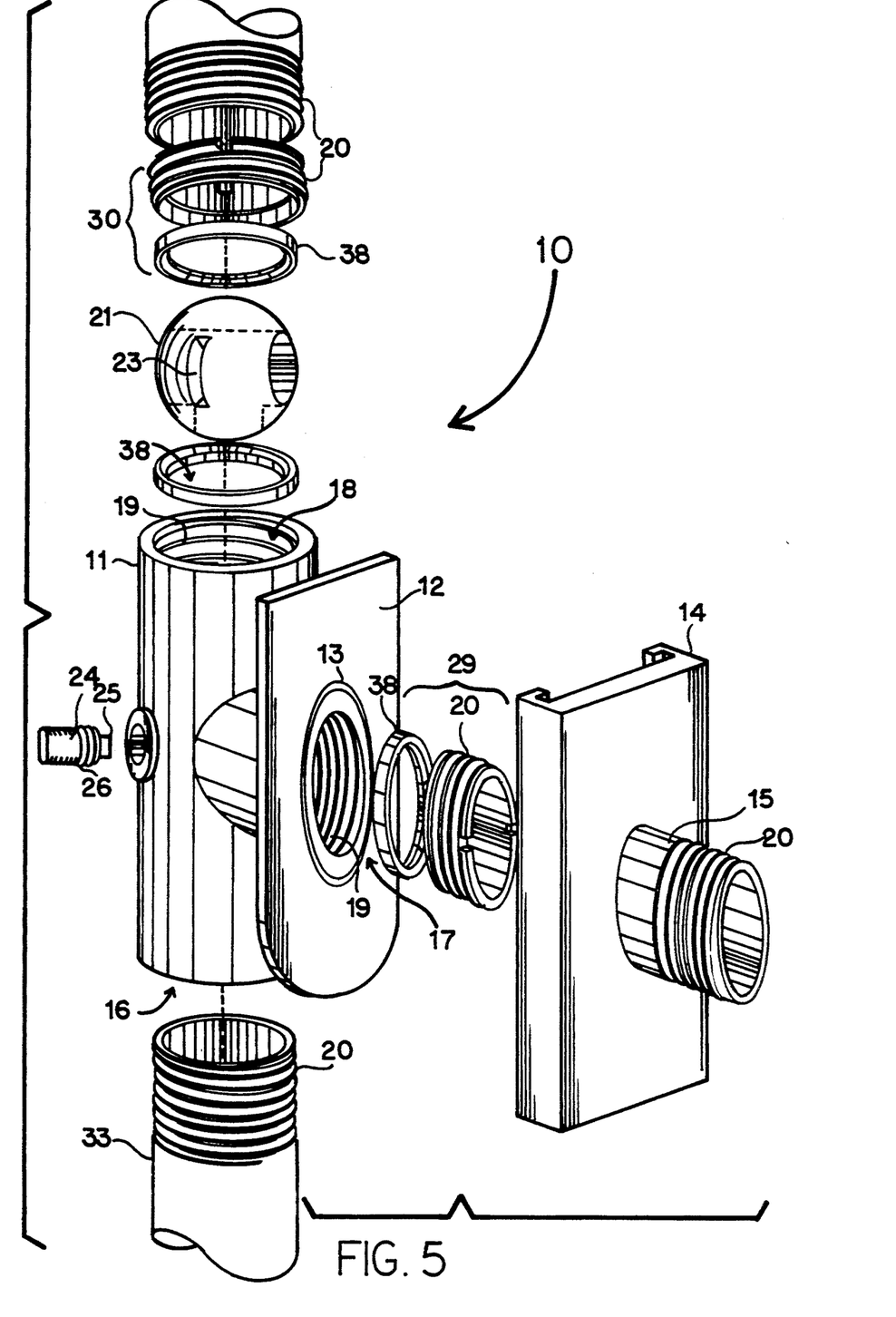
FIG. 5 is an exploded isometric detailed view of the pitless adapter valve.

A fixed ball valve seat 28 is formed inside of adapter housing 12 directly above well inlet port 16. Advantageously, fixed valve seat 28 includes a removable nylon or "TEFLON" TM -type valve seat washer 38 to provide a friction reducing surface against which ball valve 21 can seat.

A ball valve pivot bolt 24 is rotatably secured through the side of adapter housing 11 at a point which defines the pivot point for ball valve 21. A pair of small "O" rings 26 are provided along the length of the shaft of ball valve pivot bolt 24 to provide a water-tight seal between pivot bolt 24 and adapter housing 11. The inner end of ball valve pivot bolt 24 includes a diametrically disposed slot key 25 for engagement with key slot 23 in ball valve 21. Once ball valve pivot bolt 24 is in place, ball valve 21 is inserted into adapter housing 11 engaging key slot 23 with slot key 25.

After ball valve 21 is in place, a side removable valve seat 29 is threadably engaged with the female threads 19 in supply outlet port 17. Like fixed valve seat 28, side removable valve seat 29 advantageously includes a removable nylon or "TEFLON" TM -type valve seat washer 38 to provide a friction reducing surface against which ball valve 21 can seat. Removable valve seat 29 is screwed into adapter housing 11 until the valve seat 29 engages ball valve 21. Similarly, top removable valve seat 30 is threadably engaged with female threads 19 in purge outlet port 18 and screwed down until valve seat 30 engages ball valve 21. Again, top removable valve seat 30 advantageously includes a removable nylon or "TEFLON" TM -type valve seat washer 38 to provide a friction reducing surface against which ball valve 21 can seat.

Figure 3A:
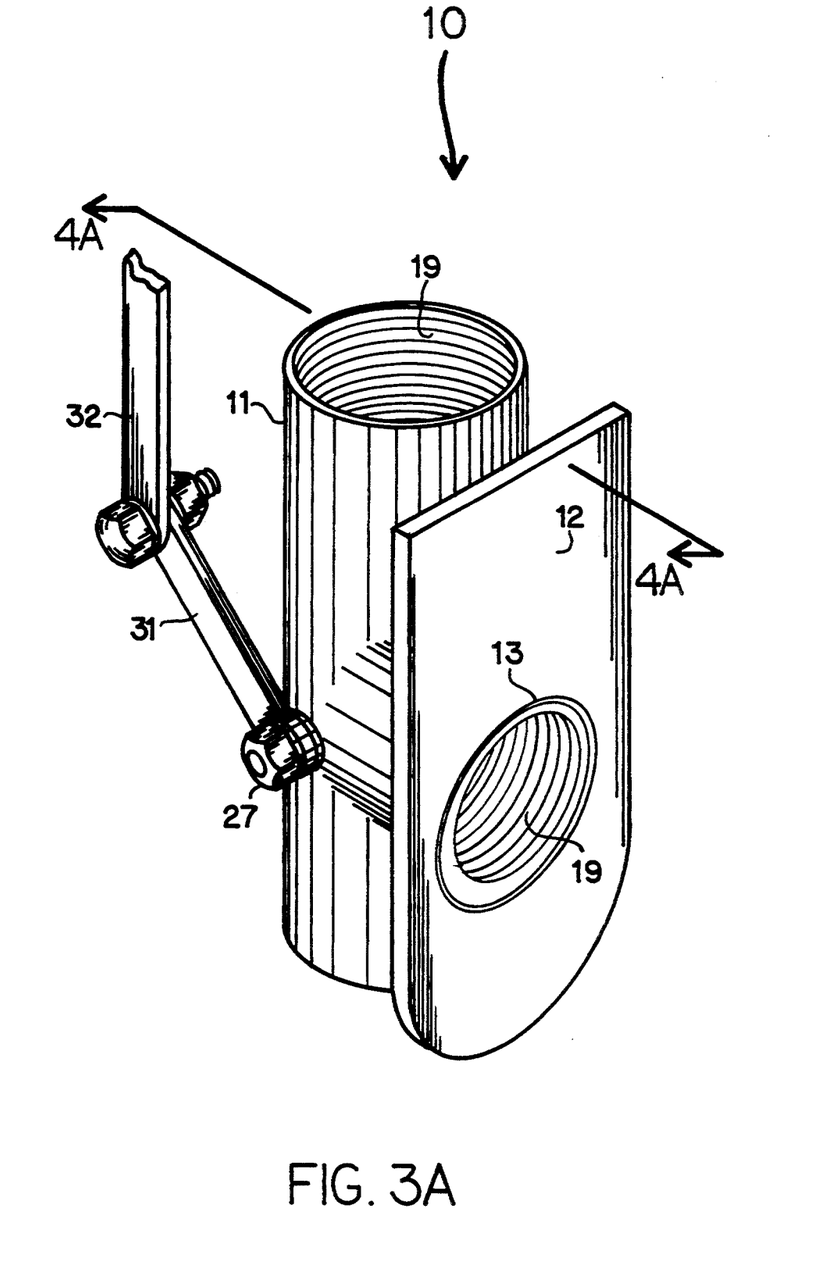
FIG. 3A is a detailed isometric view of the pitless adapter valve with the actuator handle in the purge position.
Figure 3B:
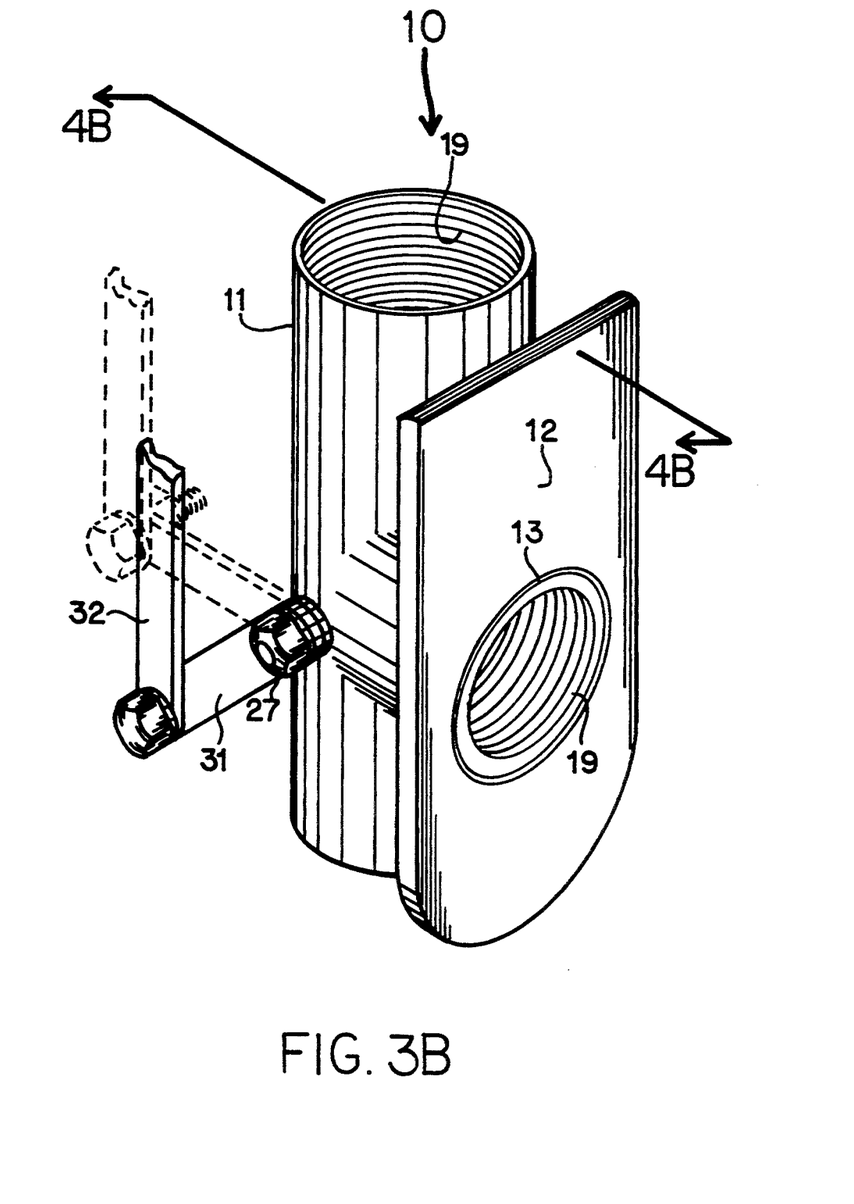
FIG. 3B is a detailed isometric view of the pitless adapter valve with the actuator handle in the supply position.

Valve actuator handle 31 is engaged with the protruding end of ball valve pivot bolt 24 and secured there via a ball valve nut 27. Valve actuator handle 31 has a handle extender 32 pivotally attached at the actuator handle's distal end. Handle extender 32 can be adjustable in length. Advantageously, the length of handle extender 32 is approximately equal to the depth at which pitless adapter valve 10 is set below the top of well casing 37.

Figure 2A:
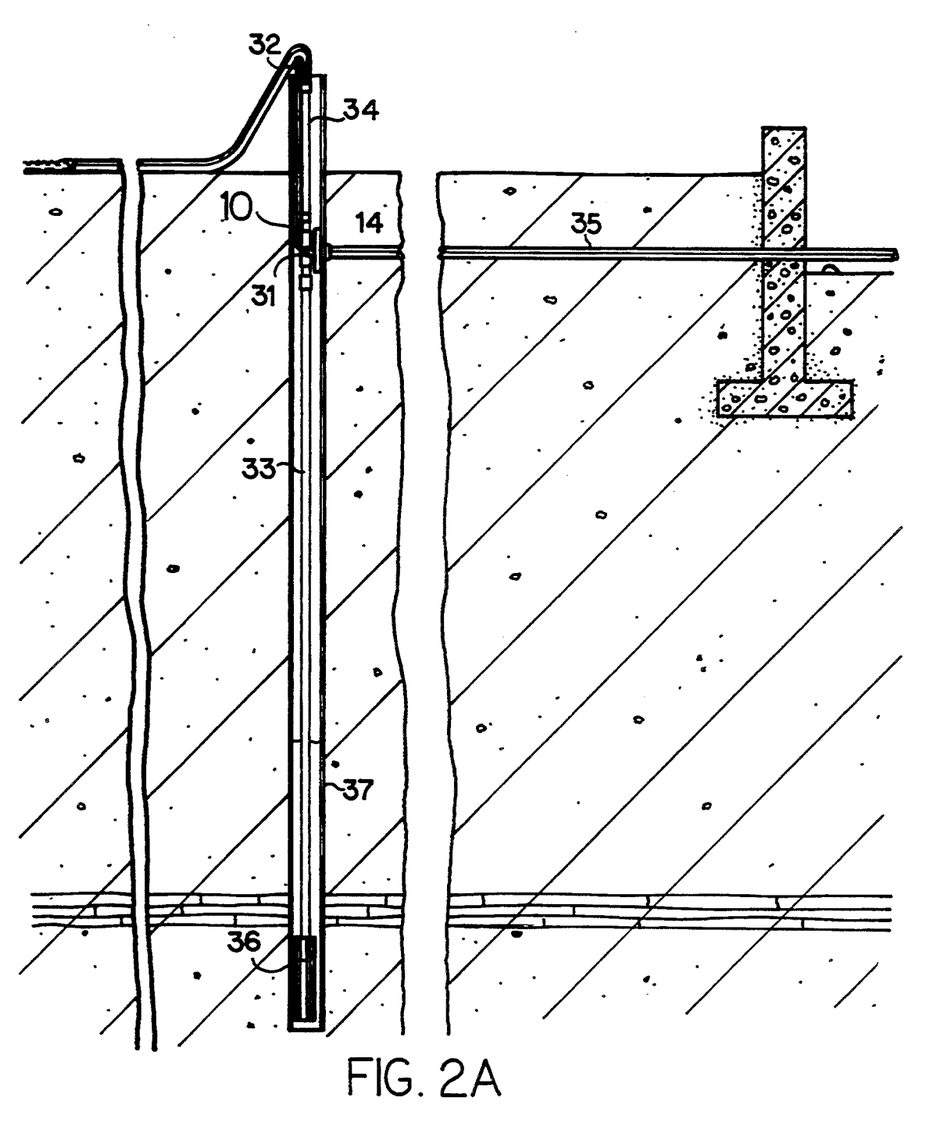
FIG. 2A is a side sectional representation of a well installation using the pitless adapter valve of the present invention, with the valve in the purge configuration, providing a fluid path between the well inlet port and the purge outlet port.
Figure 2B:
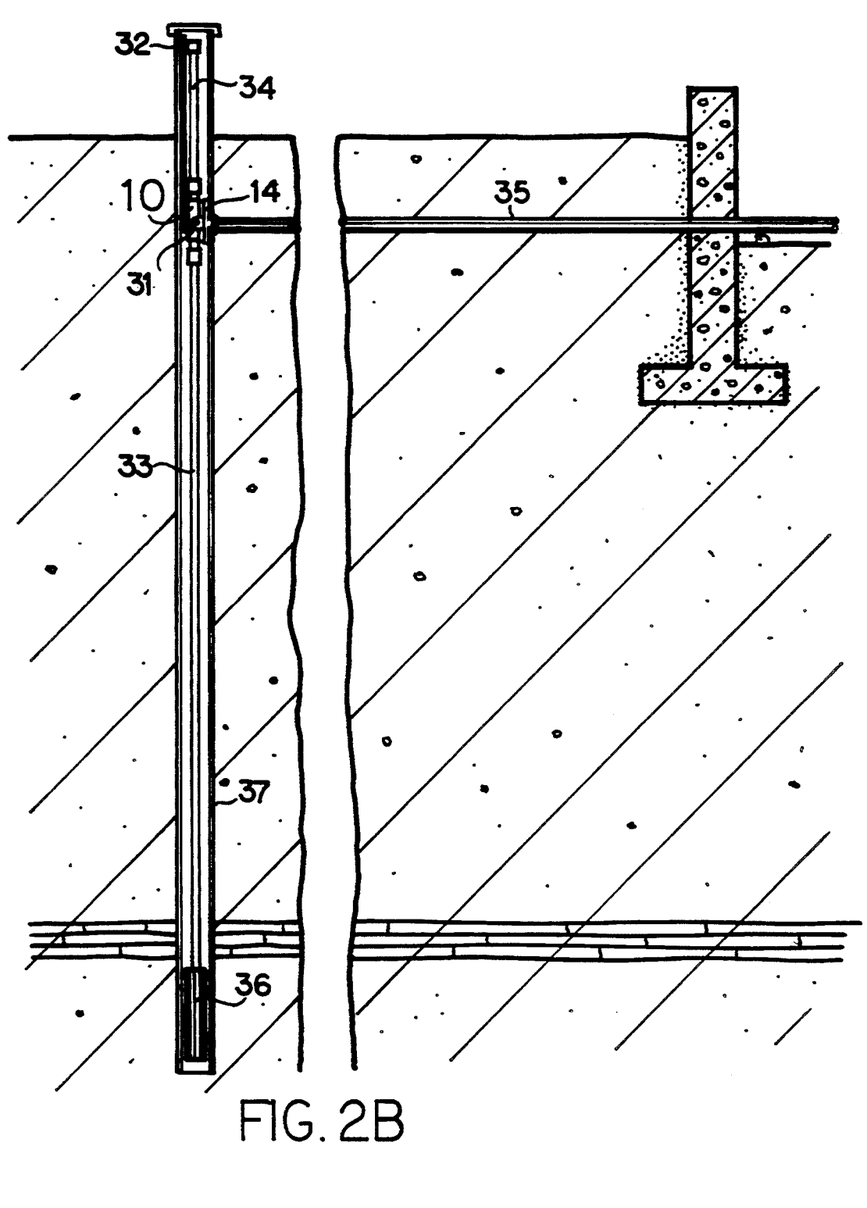
FIG. 2B is a side sectional representation of a completed well installation using a pitless adapter valve, with the valve being in the supply position, providing a fluid path between the well inlet port and the supply outlet port.

In use, pitless adapter valve 10 is installed exactly as a prior art pitless adapter would be if the well had already been cleared. For example, once the well has been drilled and well casing 37 is in place, the adapter shoe slide 14 is secured through the side of well casing 37 at a level below ground equal to the level of supply pipe 35. Adapter shoe slide 14 includes an outlet nipple 15 to which supply pipe 35 is threadably engaged using a suitable male adapter. Drop pipe 33 is then attached to pump 36 in sections as pump 36 and drop pipe 33 are lowered into the well. When pump 36 is at a predetermined point above its final resting place, the distance above its final resting point being equal to the distance below the top of the well casing at which pitless adapter valve 10 will be positioned, pitless adapter valve 10 is threadably engaged at its well inlet port 16 to male threads 20 at the top of drop pipe 33. A let down pipe 34, which will here also act as a purge conduit, is threadably engaged with purge outlet port 18. The entire assembly is then lowered down into well casing 37 until face plate 12 engages adapter shoe slide 14 and pump 16 is in its final resting place.

At this point in time, the pump setting rig is no longer necessary and can move on to its next job. A flexible hose or other suitable conduit is attached to the top end of let down pipe 34 and positioned to direct water and sediment away from well casing 37. Pump 36 is then actuated and allowed to run, thereby pumping water and sediment out of the well, valve actuator handle 31 being in the purge position. After the well is clear, i.e., there is no more sediment being pumped from the well, valve actuator handle 31 is moved to its supply position via handle extender 32. The water from pump 36 will now be supplied to the dwelling through supply pipe 35.

Throughout this description the invention has been described with reference to a domestic water well. It should be noted that the invention is not so limited and may be used in other types of well installations. While there is shown and described the present preferred embodiment of the invention, it is to be distinctly understood that this invention is not limited thereto but may be variously embodied to practice within the scope of the following claims.

I claim:
1. A pitless well adapter comprising:
a housing having a well inlet port, a supply outlet port and a purge outlet port;
coupling means for fluidly connecting the well inlet port to a well drop pipe;
coupling means for fluidly connecting the supply outlet port to a supply pipe;
coupling means for fluidly connecting the purge outlet port to a letdown pipe;
valve means, being disposed within the housing, for selectively diverting fluid from the well inlet port to the supply outlet port and from the well inlet port to the purge outlet port, wherein the valve means comprises a three way ball valve.

2. The pitless adapter of claim 1 wherein the valve means is further configured to prevent simultaneous flow of fluid to both the supply outlet port and the purge outlet port.

3. The pitless adapter of claim 2 wherein the coupling means for fluidly connecting the supply outlet port to a supply pipe comprises:
a face plate being attached around the supply outlet port;
an adapter shoe, being in fluid communication with a supply line, for slidably receiving and frictionally engaging the face plate; and
fluid sealing means interacting between the face plate and the adapter shoe to complete the fluid connection between the supply outlet port and the supply line.

4. The pitless adapter of claim 3 further comprising a valve actuator handle being attached through the housing to the valve means and configured to actuate the valve means at a remote distance above housing.

5. The pitless adapter of claim 2 further comprising a valve actuator handle being attached through the housing to the valve means and configured to actuate the valve means at a remote distance above housing.

6. The pitless adapter of claim 1 further comprising a valve actuator handle being attached through the housing to the valve means and configured to actuate the valve means at a remote distance above housing.

7. The pitless adapter of claim 1 wherein the coupling means for fluidly connecting the supply outlet port to a supply pipe comprises:
   a face plate being attached around the supply outlet port;
   an adapter shoe, being in fluid communication with a supply line, for slidably receiving and frictionally engaging the face plate; and
   fluid sealing means interacting between the face plate and the adapter shoe to complete the fluid connection between the supply outlet port and the supply line.

8. A system for supplying water in a well to a house, comprising:
   a well casing extending down from the earth's surface to a point below a level of ground water;
   a pump being positioned within the well casing and below the ground water level;
   a supply pipe being positioned underground at a frost free level and running between the house and the well casing;
   a drop pipe being in fluid communication with the pump and extending up the well casing to a level approximately equal to the level of the supply pipe;
   a housing having a well inlet port, a supply outlet port and a purge outlet port;
   coupling means fluidly connecting the well inlet port to the drop pipe at the level of the supply pipe;
   coupling means fluidly connecting the supply outlet port to the supply pipe;
   a letdown pipe extending upwardly from the housing to the approximate level of the well casing at the earth's surface;
   coupling means fluidly connecting the purge outlet port to the letdown pipe;
   valve means, being disposed within the housing, for selectively diverting fluid from the well inlet port to the supply outlet port and from the well inlet port to the purge outlet port, wherein the valve means comprises a three way ball valve.

9. The system of claim 8 wherein the valve means is further configured to prevent simultaneous flow of fluid to both the supply outlet port and the purge outlet port.

10. The system of claim 9 wherein the coupling means for fluidly connecting the supply outlet port to the supply pipe comprises:
    a face plate being attached around the supply outlet port;
    an adapter shoe, being in fluid communication with the supply line through the well casing, for slidably receiving and frictionally engaging the face plate; and
    fluid sealing means interacting between the face plate and the adapter shoe to complete the fluid connection between the supply outlet port and the supply line.

11. The system of claim 10 further comprising a valve actuator handle being attached through the housing to the valve means and configured to actuate the valve means at the earth's surface.

12. The system of claim 9 further comprising a valve actuator handle being attached through the housing to the valve means and configured to actuate the valve means at the earth's surface.

13. The system of claim 8 further comprising a valve actuator handle being attached through the housing to the valve means and configured to actuate the valve means at the earth's surface.

14. The system of claim 8 wherein the coupling means for fluidly connecting the supply outlet port to the supply pipe comprises:
    a face plate being attached around the supply outlet port;
    an adapter shoe, being in fluid communication with the supply line through the well casing, for slidably receiving and frictionally engaging the face plate; and
    fluid sealing means interacting between the face plate and the adapter shoe to complete the fluid connection between the supply outlet port and the supply line.

* * * * *